Patented Aug. 6, 1940

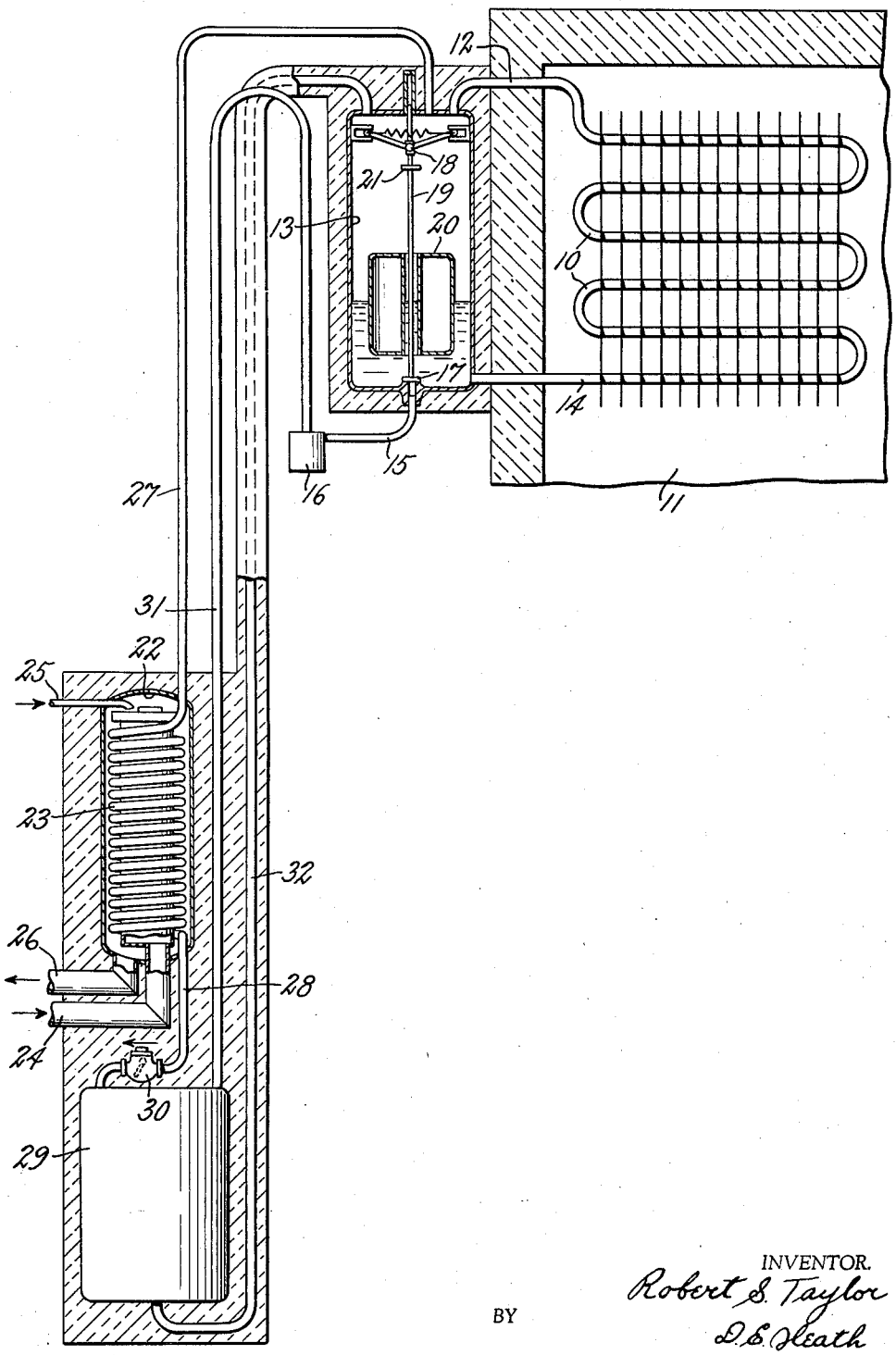

2,210,607

UNITED STATES PATENT OFFICE 2,210,607

REFRIGERATION

Robert S. Taylor, Evansville, Ind., assignor to Servel, Inc., New York, N. Y., a corporation of Delaware Application October 19, 1938, Serial No. 235,756

4 Claims. (Cl. 62—5)

My invention relates to a heat transfer system making use of evaporation and condensation of fluid and it is an object of the invention to provide such a system for transfer of heat downward and utilizing a force produced within the system to raise liquid in the system.

The single figure of the drawing shows more or less schematically a system for transferring heat downward to refrigeration apparatus and embodying the invention.

An evaporator coil 10 is located in a refrigerator compartment 11. The upper end of coil 10 is connected by a conduit 12 to the upper part of a control vessel 13. The lower end of coil 10 is connected by a conduit 14 to the lower part of control vessel 13. The lower part of control vessel 13 is also connected by a conduit 15 to a pressure vessel 16. A valve 17 controls communication of conduit 15 with control vessel 13. Valve 17 is operated by a spring toggle mechanism 18 which is connected to the valve by a rod 19. A float 20 is loosely slideable on rod 19 between valve 17 and an upper stop 21. When float 20 moves upward into engagement with stop 21, the toggle 18 is shifted upward to open valve 17. When float 20 descends into engagement with valve 17, the toggle mechanism 18 is shifted downward to snap the valve closed.

At a place below the level of evaporator coil 10 as, for example, the basement of a building in which the refrigerator 11 is on an upper floor, is located refrigeration apparatus including a cooling element 22. The refrigeration apparatus may be like that described in an application Serial No. 107,852 of Albert A. Thomas. In the cooling element 22 is a pipe coil 23. Inert gas flows into the cooling element or evaporator 22 through a conduit 24. Liquid refrigerant flows into evaporator 22 through a conduit 25. Liquid refrigerant flows downward over coil 23 and evaporates and diffuses into the inert gas producing a refrigerating effect for cooling coil 23. The resulting vapor and gas mixture leaves the evaporator through conduit 26.

The upper end of coil 23 is connected by a conduit 27 to the upper part of control vessel 13. The lower end of coil 23 is connected by a conduit 28 to the upper part of a reservoir or circulation vessel 29. A check valve 30 in conduit 28 permits only downward flow of liquid in this conduit. The upper part of vessel 29 is connected by a conduit 31 to the upper part of pressure vessel 16. Conduit 31 is looped upward above the maximum liquid level in control vessel 13. The lower part of reservoir 29 is connected by a conduit 32 to the upper part of control vessel 13.

Cooling element 22, reservoir 29, conduit 32, and control vessel 13 are preferably insulated as shown. Pressure vessel 16 may be located in the refrigerator compartment 11 and provided with surface for aid in cooling air in this compartment, or it may be made small and located outside of the compartment where it is subjected to atmospheric temperture as shown in the drawing.

Coils 10 and 23 with their interconnecting conduits and vessels as described constitute a vaporization-condensation heat transfer system which contains a suitable heat transfer fluid. In starting, when all parts of the system are at room temperature, liquid is all contained in reservoir 29 and in other parts of the system the heat transfer fluid is in vapor state. Float 20 is down and valve 17 closed. The refrigeration apparatus is started and the temperature of coil 23 is reduced until vapor in this coil condenses. Upon collapse of vapor in coil 23 and condensation of vapor which enters this coil through conduit 27 from other parts of the system, the pressure drops in coil 23, control vessel 13, and evaporator coil 10. The pressure does not drop in reservoir 29 and pressure vessel 16 which are connected by conduit 31 and segregated from the rest of the system by valve 17, check valve 30, and liquid in conduit 32. The pressure difference increases until liquid is forced high enough in conduit 32 to overflow into control vessel 13.

As the level of liquid rises in vessel 13 and coil 10, float 20 moves upward until valve 17 is snapped open. When valve 17 opens, the pressures equalize through conduit 15 and liquid flows through this conduit from vessel 13 into pressure vessel 16. Liquid evaporates in coil 10, cooling the refrigerator compartment 11. The vapor flows from coil 10 through conduit 12, control vessel 13, and conduit 27 to condenser coil 23. Vapor condenses to liquid in coil 23 and flows downward through conduit 28 into reservoir 29. As the liquid level recedes in control vessel 13, float 20 moves downward until valve 17 is closed. Liquid in pressure vessel 16 evaporates due to heat transfer from atmosphere. This vapor accumulates in the upward looped conduit 31, causing a slight increase in pressure in this conduit and also in the upper parts of pressure vessel 16 and reservoir 29. This pressure causes depression of liquid to the lower end of conduit 15 during the time valve 17 is open so that the vapor bubbles upward through conduit 15 and control vessel 13. Since this pressure is also exerted in the upper part of reservoir 29, an equivalent liquid column forms above check valve 30 before flow of liquid through this valve from the condenser into reservoir 29. When valve 17 closes, vapor formed in vessel 16 can no longer escape through conduit 15 so that the pressure above the surface level of liquid in pressure vessel 16, in conduit 31, and in the upper part of reservoir 29 increases, forcing liquid from reservoir 29 upward through conduit 32 into control vessel 13. As liquid enters control vessel 13, the level of liquid rises and raises float 20 until valve 17 is snapped open to again equalize the excess pressure in pressure vessel 16 and reservoir 29.

Various changes may be made within the scope of this invention which is not limited except as set forth in the following claims.

What is claimed is:

1. A heat transfer system including a circuit for heat transfer fluid having a plurality of places of vaporization at an upper elevation, a place of condensation at a lower elevation, a vessel for accumulating liquid below said place of condensation, a conduit from the lower part of said vessel below the surface level of liquid therein to said places of vaporization at said upper elevation, and means for alternately admitting condensate to said vessel from said place of condensation and trapping vapor from one of said places of vaporization above said surface level of liquid in said vessel to cause rise and fall of said liquid surface level and upward flow of liquid in said conduit during the fall of said surface level.

2. A method of heat transfer which includes vaporizing fluid at a plurality of places at an upper elevation, condensing vaporized fluid at a lower elevation, forming the condensate into a body of liquid, and raising condensate in a path of flow extending from said body of liquid below the surface level thereof upward to said upper elevation by intermittently trapping vapor from one of said places of vaporization above said surface level of liquid to exert pulsating force of said vapor thereon.

3. A heat transfer system including a circuit for heat transfer fluid having a plurality of evaporators, an upper vessel connected to supply liquid to said evaporators, a condenser located below said vessel and said evaporators and connected to receive vapor from one of said evaporators, a lower vessel connected to receive liquid from said condenser and vapor from another of said evaporators, a conduit from the lower part of said lower vessel below the surface level of liquid therein to said upper vessel, and means for intermittently segregating said second evaporator and said lower vessel from other parts of the system so that the pressure of vapor from said evaporator above the surface level of liquid in said lower vessel increases and forces liquid through said conduit into said upper vessel.

4. A heat transfer system as set forth in claim 3 in which said segregating means is operative responsive to variation in level of liquid in said upper vessel.

ROBERT S. TAYLOR.